(12) United States Patent
Alfimov et al.

(10) Patent No.: US 7,297,751 B2
(45) Date of Patent: *Nov. 20, 2007

(54) PHOTOCONTROLLED PHOTOCHROMIC ELECTROLUMINESCENT AND ELECTROCONDUCTIVE POLYMERS FOR PHOTONICS

(75) Inventors: Mikhail Vladimirovich Alfimov, Moscow (RU); Valery Alexandrovich Barachevsky, Moscow (RU); Valery Alexandrovich Vasnev, Moscow (RU); Alexander Alexandrovich Dunaev, Moscow (RU); Igor Viktorovich Zavarzin, Lyublinskaya (RU); Sergei Nikolaevich Ivanov, Moscow (RU); Muhammed Lastanbievich Keshtov, Moscow (RU); Mikhail Mikhailovich Krayushkin, Moscow (RU); Yury Aleksandrovich Pyankov, Moskovskaya oblast (RU); Stanislav Leonidovich Semenov, Moscow (RU); Yury Petrovich Strokach, Moskovskaya oblast (RU); Vladimir Nikolaevich Yarovenko, Moscow (RU)

(73) Assignees: Samsung Electronics Co., Ltd. (KR); Photochemistry Center of Russian Academy of Sciences (RU)

( * ) Notice: Subject to any disclaimer, the term of this patent is extended or adjusted under 35 U.S.C. 154(b) by 51 days.

This patent is subject to a terminal disclaimer.

(21) Appl. No.: 11/259,281

(22) Filed: Oct. 27, 2005

(65) Prior Publication Data

US 2006/0091364 A1 May 4, 2006

(30) Foreign Application Priority Data

Oct. 28, 2004 (RU) .............................. 2004131492

(51) Int. Cl.
*C08F 118/02* (2006.01)
*C03F 7/004* (2006.01)

(52) U.S. Cl. ...................... 526/204; 526/242; 526/308; 526/319; 526/346; 430/2; 430/18; 430/19; 252/582; 252/301.16

(58) Field of Classification Search ..................... None
See application file for complete search history.

(56) References Cited

U.S. PATENT DOCUMENTS 6,787,621 B2 * 9/2004 Kim et al. ................... 526/204
2006/0079653 A1 * 4/2006 Dunaev et al. .............. 526/242

OTHER PUBLICATIONS

Fan et al. "Novel Photochromic Compounds Responding to InGaN Diode Laser; Synthesis and Photochromic Behavior of Dibenzothiophenylcycloalkenes",Chinise Chemical Letters,vol. 10,No. 8,pp. 693-696,1999.*
Irie "Diarylethenes for Memories and Switches". Chem.Rev. 200,100,1685-1716.*
Huang et al."Facile Synthesis of Novel Photochromic 1,2-Diheteroaryl-Substituted Cycloalkenes by Titanium -Induced Intramolecular Coupling Reaction",1999,pp. 1092-1094..*

* cited by examiner

*Primary Examiner*—James Seidleck
*Assistant Examiner*—Gennadiy Mesh
(74) *Attorney, Agent, or Firm*—MacPherson Kwok Chen & Heid LLP; David S. Park

(57) ABSTRACT

The invention relates to photochromic monomers based on benzothiophenes and a method for preparing them, and to photochromic polymers-polyazomethines that are reversibly photocontrollable due to the introduction of photochromic fragments from the class of dihetarylethenes into their structure. The invention provides photochromic photocontrollable polymers for the creation of new information technologies.

7 Claims, 3 Drawing Sheets

PHOTOCONTROLLED PHOTOCHROMIC ELECTROLUMINESCENT AND ELECTROCONDUCTIVE POLYMERS FOR PHOTONICS

CROSS-REFERENCE TO RELATED APPLICATION

The present application claims priority to and the benefit of Russian Patent Application No. 2004-131492, filed on Oct. 28, 2004, the disclosure of which is hereby incorporated herein by reference in its entirety.

BACKGROUND OF THE INVENTION

1. Field of the Invention

The invention relates to new photochromic monomers, new photochromic polymers, and methods of obtaining them to create new information technologies, photocontrolled electroluminescent and electroconductive devices including displays and photoswitched polymer light diodes.

2. Description of the Background

Flexible and relief displays and light emitting diodes that use organic electroluminescent and electroconductive polymers and polyazomethines or condensation nitrogen containing heterochain polymers have been developed.

A drawback of such polymer materials is that their electroluminescence and electroconductivity are not controlled by light. However, new properties of these polymers expand their functions in the field of photonics.

SUMMARY OF THE INVENTION

The present invention provides photochromic electroluminescent and electroconductive polymers, the properties of which become reversibly photocontrollable due to the introduction of photochromic fragments into their structure. Consequently, such polymers have expanded functional possibilities.

Photochromic polymers of this type are suitable for use in the development of photochromic materials for various fields of photonics ("Applied Photochromic Polymer Systems." McArdle C. B., Ed. Blackie, Glasgow, 1992; Barachevsky V. A. "Photochromic organic media: state-of-the-art and future." Proc. SPIE, vol. 2968, 77-86, 1997). Use of the proposed electroconductive and electroluminescent polymers with photochromic fragments opens the prospects for development of a different type of display with double photo- and electrocontrol.

Thermally irreversible photochromic conversions, which are characteristic for compounds of the class of dihetarylethenes, are successfully used to create photochromic registering mediums providing for the development of a three-dimensional bitwise operative optical memory (M. Irie "Dihetarylethenes for Memories and Switches," Chem. Reviews, vol. 100, 1685-1716, 2000). The inclusion of photochromic fragments into a polymer chain makes it possible to improve developed photochromic registering media due to an increase of the concentration of photochromic molecules in a polymer medium and a sharp reduction of their diffusion displacement. The result of such an improvement is a substantial increase in the information capacity. The absence of mutual thermal conversion of the two forms of dihetarylethene molecules used as photochromic fragments of polymers expands the field of use of reversive photochromic radiation photoswitches (J. A. Delaire, K. Nakatani "Linear and Nonlinear Optical Properties of Photochromic Molecules and Materials," Chem. Reviews, vol., 100, 1817-1845, 2000).

Additional features of the invention will be set forth in the description which follows, and in part will be apparent from the description, or may be learned by practice of the invention.

The present invention discloses photochromic monomers of general formula

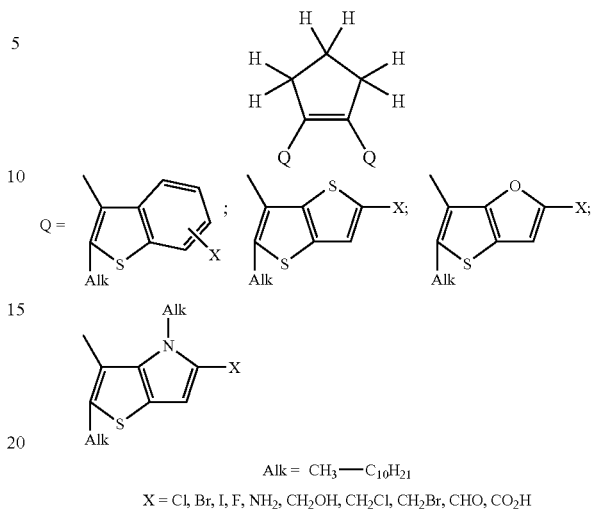

$Alk = CH_3 — C_{10}H_{21}$
$X = Cl, Br, I, F, NH_2, CH_2OH, CH_2Cl, CH_2Br, CHO, CO_2H$

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF THE ILLUSTRATED EMBODIMENTS

Figure 1:
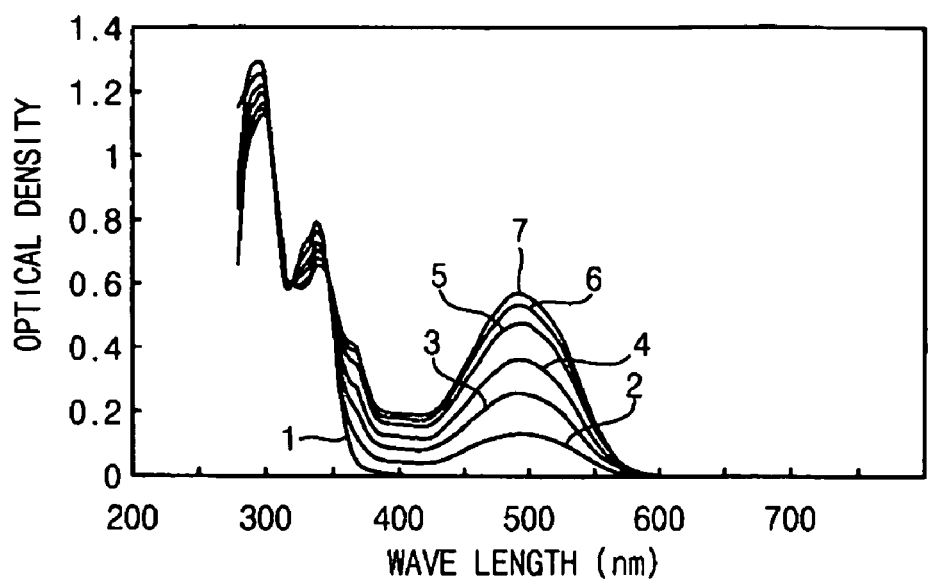
FIG. 1 shows absorption spectra of the initial open A (curve 1) and photoinduced B (curves 2-7) of the photochromic monomer 5 in toluene to (1) and after irradiation with UV light as the exposition increases, respectively.
Figure 2:
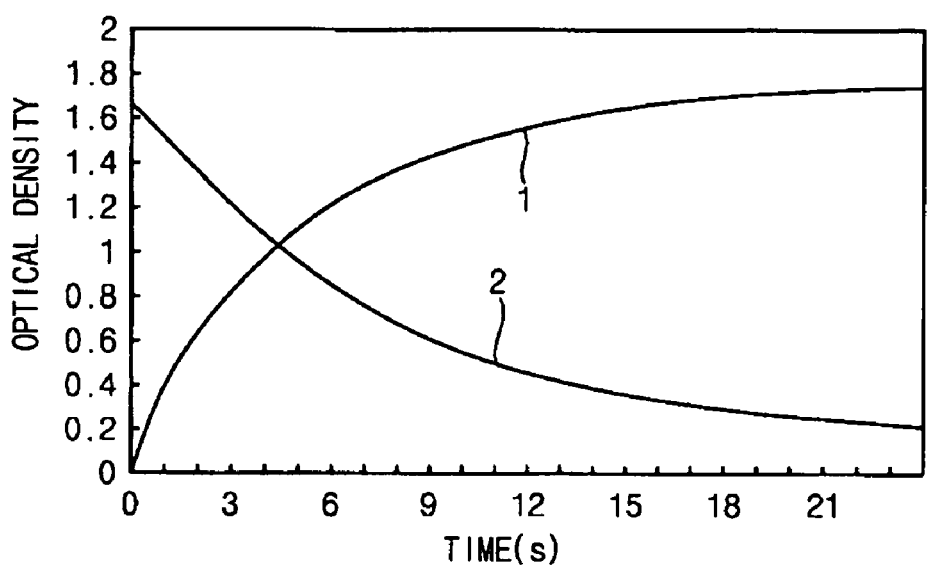
FIG. 2 shows kinetic photocoloring curves with UV light (curve 1) and photodecoloration with visual light (curve 2) of a solution of a photochromic monomer 5 in toluene at a wavelength of the maximum of the band of absorption of cyclic form B.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

The present invention discloses the use of the following dihetarylethene functional groups in the following Structural Formula 1 to form structural photochromic monomers to obtain photocontrolled electroluminescent and electroconductive polymers.

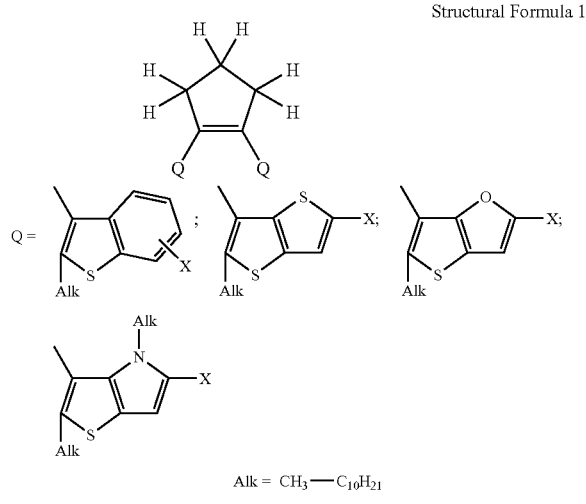

Structural Formula 1

Alk = $CH_3$—$C_{10}H_{21}$
X = Cl, Br, I, F, $NH_2$, $CH_2OH$, $CH_2Cl$, $CH_2Br$, CHO, $CO_2H$

As shown in the following Equation 1, the photochromism of diarylethenes (DAE) includes reversible photocyclization, i.e., in a photoinduced transition from an open form (OF) A to a cyclic form (CF) B.

Equation 1

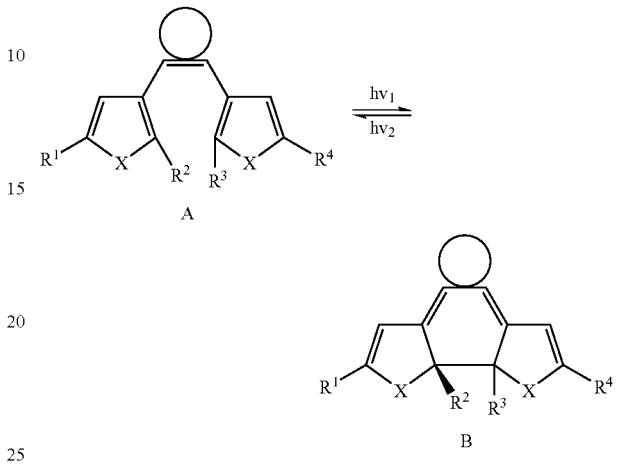

Since a change in the conjugated linkage system in photochromic molecules occurs, it makes it possible to control the indicated properties of the polymers.

The present invention also provides a method for the preparation of new functional dihetarylethenes, photochromic polyazomethines, photochromic frame polyazomethines and methods for the preparation thereof, and the use of new functional dihetarylethenes as photochromic fragments. The use of these photochromic compounds provides polyazomethines with reversible photocontrol of electroluminescent and electroconductive properties as a result of photochromic conversions of the polymeric fragments which change the degree of electronic conjugation.

As shown in the following Equation 2, a method for preparing photochromic monomers comprises acylation of benzothiophene with a dichloroanhydride of glutaric acid in methylene chloride in the presence of aluminum chloride. The method further comprises reductive cyclization of the obtained diketones under the action of $TiCl_4$, Zn in tetrahydrofuran (THF) in the presence of pyridine, with subsequent formulation of the reaction products with dichloromethyl ether in nitrobenzene in the presence of aluminum chloride.

Equation 2

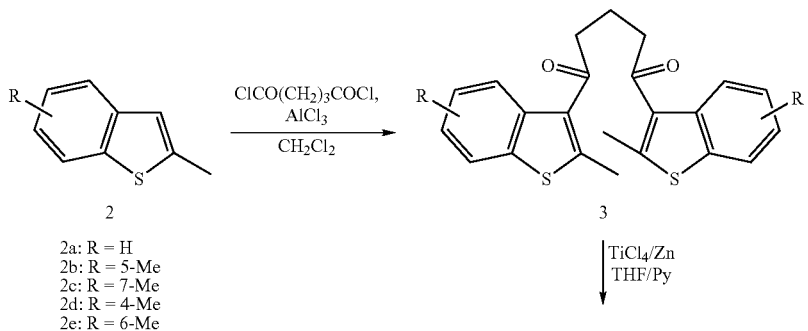

2a: R = H
2b: R = 5-Me
2c: R = 7-Me
2d: R = 4-Me
2e: R = 6-Me

-continued

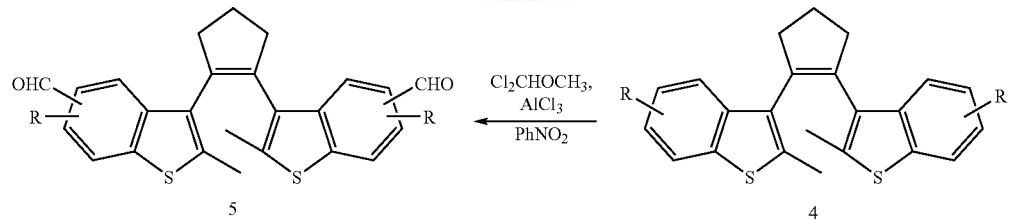

5a: R = H, 6-CHO
5b: R = 5-Me, 6-CHO
5c: R = 7-Me, 6-CHO
5d: R = 4-Me, 5-CHO
5e: R = 6-Me, 5-CHO

Photochromic polyazomethines may be represented by the following Structural Formula 2 based on the photochromic monomers have the following general structural formula and a molecular weight from about 25,000 to about 50,000.

Structural Formula 2

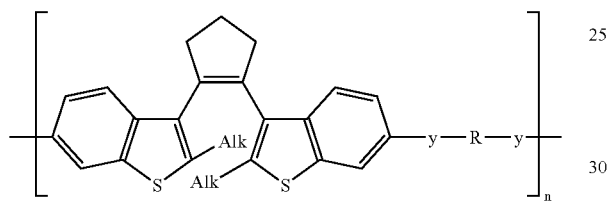

wherein Alk is $CH_3$—$C_{10}H_{21}$, y is —C=N— or —N=C—, n is 50-100, and R is one of Structural Formula 3.

Structural Formula 3

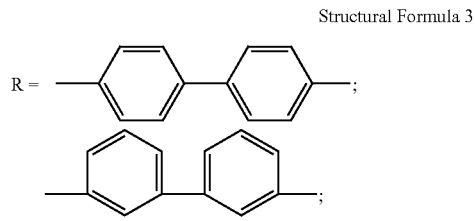

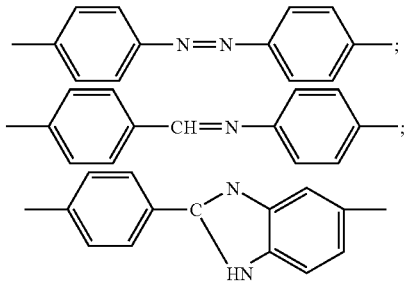

A method for preparing the photochromic polazomethines of Structural Formula 2 comprises polycondensation in a solution of monomers with aromatic diamines or dialdehydes at a temperature of from about 20° C. to about 200° C.

Frame polymers refer to polymers that include a central carbon atom in the makeup of the volumetric side cyclic (frame) grouping. Photochromic frame polyazomethines may be used in photonic devices such as photocontrolled displays three dimensional operative optical memory, linear and non-linear optical radiation photo switches.

The photochromic frame polyazomethines of the present invention have a molecular weight ranging from about 30,000 to about 50,000 and may be represented by Structural Formula 4.

Structural Formula 4

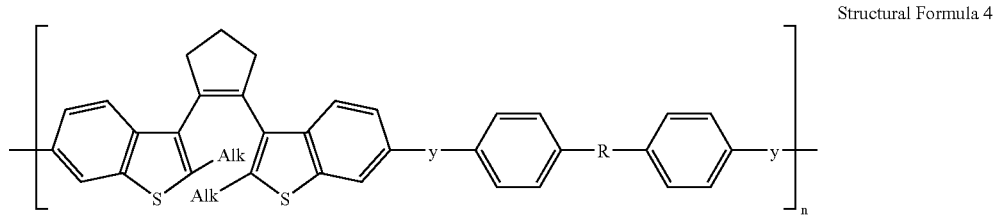

wherein Alk is $CH_3$—$C_{10}H_{21}$, Y is —C=N— or —N=C—, n is about 50 to about 100, and R=one of Structural Formula 5.

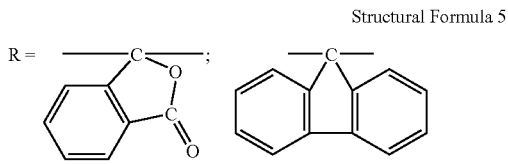

Structural Formula 5

A method for preparing the photochromic frame polyazomethines of the present invention comprises polycondensation in a solution of photochromic monomer with frame aromatic diamines or dialdehydes at a temperature of from about 20° C. to about 200° C.

It is to be understood that both the foregoing general description and the following detailed description are exemplary and explanatory and are intended to provide further explanation of the invention as claimed.

EXAMPLE 1

Photochromic monomers 1,2-bis(2-methyl-6-formyl-1-benzothiophen-3-yl) cyclopentenes 5a-e from the class of photochromic monomers that comprise benzothiophene fragments linked by a cyclopentene bridge were synthesized using benzothiophenes 2a-e according to the reaction presented in Equation 2.

The initial benzothiophenes 2a-e were obtained according to the following methods. 2-methylbenzothiophene (2a) was prepared according to "Synthesis of sulfides, thiophenes and thiols of the type of compounds encountered in oil," edited by E. N. Karaulova, Pub. "Nauka," 1988, p. 180 which is incorporated by reference. 2,4-dimethylbenzothiophene and 2,7-dimethylbenzothiophene (2b, 2c were prepared according to Monatsh. Chem. 1960, 91, and 1070, which is incorporated by reference. 2,4-dimethylbenzothiophene and 2,6-dimethylbenzothiophene (2d, 2e) were prepared according to J.Chem.Soc., Chem.Com. 1974, 5, 174, which is incorporated by reference.

The synthesis of 1,2-bis(2-methyl-6-formyl-1-benzothiophen-3-yl) cyclopentenes 5a-e includes acylation of the benzothiophenes 2a-e with a dichloranhydride of glutaric acid in methylene chloride in the presence of aluminum chloride. The synthesis further includes the subsequent reductive cyclization of the obtained diketones 3a-e, which was distinguished in that the compounds 4a-e were obtained with about 60% to about 73% yield in the case of cyclization of diketones 3a-e under the action of $TiCl_4$, Zn in THF in the presence of pyridine. In contrast, literature provides a description of the preparation of the compound 4a by cyclization of diketone 3a under the action of $TiCl_4$, Zn in THF with a yield of 54% (Synthesis 1998, 1092-1094). The subsequent formulation of products 4a-e by dichloromethyl ether in nitrobenzene in the presence of aluminum chloride results in the formation of 1,2-bis(2-methyl-6-formyl-1-benzothiophen-3-yl) cyclopentenes 5a-e.

1,5-bis-(methyl-1-benzothiophen-3-yl)pentane-1,5-diones of 3a-e were synthesized by combining 42.5 mmoles of anhydrous aluminum chloride at 0° C. with a well-stirred mixture of 20.2 mmoles of methylbenzothiophene 2a-e and 10.1 mmoles of a dichloranhydride of glutaric acid in 50 mL of methylene chloride. The resulting compound was stirred at room temperature for about 3 hours to about 6 hours. The compound was poured onto ice with water and extracted with methylene chloride (3×100 mL). The gathered organic layers were washed with an aqueous solution of $NaHCO_3$, dried above magnesium sulfate, the solvent was vacuum stripped. The residue was recrystallized from hexane.

3.25 g of 82% of 1,5-Bis-(2-methyl-1-benzothiophen-3-yl)pentane-1,5-dione 3a had a melting range of about 165° C. to about 167° C. (hexane:chloroform, 6:1, vol.). The mass-spectrum was m/z: 392, [M]+, the NMR spectrum 1H (DMSO-$d_6$, δ, ppm, J/Hz) was 2.0-2.2 (m, 2H, $CH_2$), 2.62 (s, 6H, 2x$CH_3$), 3.1-3.2 (bm, 4H, 2x$CH_2$), 7.3-7.5 (bm, 4H, 4xCHarom.), 7.85-8.2 (bm, 4H, 4xCHarom.). The actual concentrations (%) were 70.42 C, 5.16 H, and 16.29 S in $C_{23}H_{20}O_2S_2$. The calculated concentrations (%) were 70.37 C, 5.14H, and 16.34 S.

3.57 g of 84% 1,5-Bis-(2,5-dimethyl-1-benzothiophen-3-yl)pentane-1,5-dione 3b had a melting range of about 171° C. to about 173° C. (hexane:chloroform, 6:1, vol.). The mass-spectrum was m/z: 420, [M]+, the NMR spectrum 1H (DMSO-$d_6$, δ, ppm, J/Hz) was 2.0-2.3 (m, 2H, $CH_2$), 2.40 (s, 6H, 2x$CH_3$), 2.62 (s, 6H, 2x$CH_3$), 2.75-3.2 (bm, 4H, 2x$CH_2$), 7.4-8.1 (bm, 6H, 6xCHarom.). The actual concentrations (%) were 71.45 C, 5.77H, and 15.20 S. $C_{25}H_{24}O_2S_2$. The calculated concentrations (%) were 71.39 C, 5.75H, and 15.25 S.

3.61 g of 85% 1,5-Bis-(2,7-dimethyl-1-benzothiophen-3-yl)pentane-1,5-dione 3c had a melting range of about 159 to about 161° C. (hexane:chloroform, 6:1, vol.). The mass-spectrum was m/z: 420, [M]+, the NMR spectrum 1H (DMSO-$d_6$, δ, ppm, J/Hz) was 2.1-2.4 (m, 2H, $CH_2$), 2.56 (s, 6H, 2x$CH_3$), 2.66 (s, 6H, 2x$CH_3$), 2.8-3.2 (bm, 4H, 2x$CH_2$), 7.1-7.5 (bm, 4H 4xCHarom.), 8.0-8.3 (bm, 2H, 2xCHarom.). The actual concentrations (%) were 71.43 C, 5.73 H, and 15.29 S. $C_{25}H_{24}O_2S_2$. The calculated concentrations (%) were 71.39 C, 5.75H, and 15.25 S.

3.32 g of 78% 1,5-Bis-(2,4-dimethyl-1-benzothiophen-3-yl)pentane-1,5-dione 3d had a melting range of about 156° C. to about 158° C. (hexane:chloroform, 6:1, vol.). The mass-spectrum, m/z was 420, [M]+, the NMR spectrum 1H (DMSO-$d_6$, δ, ppm, J/Hz) was 2.0-2.3 (m, 2H, $CH_2$), 2.62 (s, 6H, 2x$CH_3$), 2.64 (s, 6H, 2x$CH_3$), 2.9-3.2 (bm, 4H, 2$CH_2$), 7.2-8.0 (bm, 6H, 6xCHarom.). The actual concentrations (%) were 71.35 C, 5.77H, and 15.30 S. $C_{25}H_{24}O_2S_2$. The calculated concentrations (%) were 71.39 C, 5.75H, and 15.25 S.

3.66 g of 86% 1,5-Bis-(2,6-dimethyl-1-benzothiophen-3-yl)pentane-1,5-dione 3e had a melting range of about 171° C.-173° C. (hexane:chloroform, 6:1, vol.). The mass-spectrum was m/z: 420, [M]+, the NMR spectrum 1H (DMSO-$d_6$, δ, ppm, J/Hz) was 2.05-2.25 (m, 2H, $CH_2$), 2.44 (s, 6H, 2x$CH_3$), 2.62 (s, 6H, 2x$CH_3$), 2.9-3.15 (bm, 4H, 2x$CH_2$), 7.25-7.4 (bm, 2H, 2xCHarom.), 7.7-7.9 (bm, 4H, 2xCHarom.). The actual concentrations (%) were 71.47 C, 5.73 H, and 15.31 S. $C_{25}H_{24}O_2S_2$. The calculated concentrations (%) were 71.39 C, 5.75H, and 15.25 S.

1,2-bis-(2-methyl-1-benzothiophen-3-yl) cyclopentene 4 was prepared by combining 2.8 mL of $TiCl_4$ dropwise to a well-stirred suspension of 7.93 mmoles of zinc in a freshly-distilled anhydrous THF (50 mL) at −10° C. under argon. After the addition is finished, the reaction mixture is heated under argon for about 1 hour. It is then cooled to 20° C. and 12.8 mmoles of diketone 3a-e and anhydrous pyridine (5 mL) are added to the mixture. The mixture is then boiled under argon for about 20 hours more, poured into 150 mL of 10% $K_2CO_3$ and the aqueous layer is extracted by $Et_2O$ (5×100 mL). The gathered organic extracts are dried by MgSO$_4$ and stripped by vacuum. The residue is cleaned by flash-chromatography on silicagel (Merck, 0.063-0.1), eluent-petroleum ether (40/70)-AcOEt (10:1, volume).

2.76 g of 60% 1,2-Bis-(2-methyl-1-benzothiophen-3-yl) cyclopentene 4a with a melting range of about 186.5° C. to about 187.5° C., and a literature melting range of 187° C. to about 188° C. (Synthesis 1998, 1092-1094) was obtained.

3.19 g of 69% of 1,2-Bis-(2,5-dimethyl-1-benzothiophen-3-yl)cyclopentene 4b had a melting range of about 165° C. to about 167° C. (hexane:chloroform, 6:1, vol.). The mass-spectrum was m/z: 388, [M]+, the NMR spectrum 1H (DMSO-d$_6$, δ, ppm, J/Hz) was 2.08-2.23 (bm, 2H, CH$_2$), 2.40 (s, 6H, 2xCH$_3$), 2.52 (s, 6H, 2xCH$_3$), 3.09-3.24 (bm, 4H, 2xCH$_2$), 7.16 (m, 2H, Harom.), 7.31 (m, 2H, Harom.), 7.55 (m, 2H, Harom.). The actual concentrations (%) were in 77.30 C, 6.21H, and 16.43 S. C$_{25}$H$_{24}$O$_2$S$_2$. The calculated concentrations (%) were 77.35 C, 6.23H, and 16.38 S.

3.37 g of 73% 1,2-Bis-(2,7-dimethyl-1-benzothiophen-3-yl)cyclopentene 4c had a melting range of about 174° C. to about 176° C. (hexane:chloroform, 6:1, vol.). The mass-spectrum was m/z: 388, [M]+, the NMR spectrum 1H (DMSO-d$_6$, δ, ppm, J/Hz) was 2.08-2.23 (bm, 2H, CH$_2$), 2.50 (s, 6H, 2xCH$_3$), 2.52 (s, 6H, 2xCH$_3$), 3.09-3.24 (bm, 4H, 2xCH$_2$), 7.02 (m, 2H, Harom.), 7.12 (m, 2H, Harom.), 7.21 (m, 2H, Harom.). The actual concentrations (%) were 77.32 C, 6.24H, and 16.45 S. C$_{25}$H$_{24}$S$_2$. The calculated concentrations (%) were 77.25 C, 6.26 H, and 16.50 S.

2.82 g of 61% of 1,2-Bis-(2,4-dimethyl-1-benzothiophen-3-yl)cyclopentene 4d had a melting range of about 171° C. 173° C. (hexane:chloroform, 6:1, vol.). The mass-spectrum was m/z: 388, [M]+, the NMR spectrum 1H (DMSO-d$_6$, δ, ppm, J/Hz) was 2.08-2.23 (bm, 2H, CH$_2$), 2.52 (s, 6H, 2xCH$_3$), 2.69 (s, 6H, 2xCH$_3$), 3.09-3.24 (bm, 4H, 2xCH$_2$), 7.00 (m, 2H, Harom.), 7.20 (m, 2H, Harom.), 7.52 (m, 2H, Harom.). The actual concentrations (%) were 77.33 C, 6.24H, and 16.48 S. C$_{25}$H$_{24}$S$_2$. The calculated concentrations (%) were 77.26 C, 6.23 H, and 16.52 S.

3.0 g of 65% 1,2-Bis-(2,6-dimethyl-1-benzothiophen-3-yl) cyclopentene 4e had a melting range of about 184° C. to about 186° C. The mass-spectrum was m/z: 388, [M]+, the NMR spectrum 1H (DMSO-d$_6$, δ, ppm, J/Hz) was 2.21-2.23 (bm, 2H, CH$_2$), 2.44 (s, 6H, 2xCH$_3$), 2.52 (s, 6H, 2xCH$_3$), 3.09-3.24 (bm, 4H, 2xCH$_2$), 7.18 (m, 2H, Harom.), 7.38 (m, 2H, Harom.), 7.53 (m, 2H, Harom.). The actual concentrations (%) were 77.30 C, 6.24H, and 16.44 S. C$_{25}$H$_{24}$S$_2$. The calculated concentrations (%) were 77.41 C, 6.22H, and 16.50 S.

1,2-bis-(formyl-1-benzothiophen-3-yl) cyclopentenes of 5a-e were synthesized by combining 50 mmoles of dichlormethyl ether and 13.35 mmoles of anhydrous aluminum chloride to a solution of 3.33 mmoles of 1,2-bis-(dimethyl-1-benzothiophen-3-yl)cyclopentene 4a-e in nitrobenzene (25 mL) at 0° C. The mixture was stirred for 30 min at 0° C. and 20 hours at room temperature. The reaction mixture was poured onto ice with water and the product was extracted with ethyl acetate, washed with water, and dried with magnesium sulfate. After distillation of nitrobenzene under vacuum, the product was purified by column chromatography (Silica Gel, 0.063-0.1), eluent/petroleum ether (40/70):ethyl acetate (6:1, volume).

0.56 g of 40% of 1,2-Bis-(2-methyl-6-formyl-1-benzothiophen-3-yl)cyclopentene 5a had a melting range of about 196° C. to about 197° C. (hexane:chloroform, 6:1, vol.). The mass-spectrum was m/z: 416, [M]+, the NMR spectrum 1H (DMSO-d$_6$, δ, ppm, J/Hz) was 2.25 (m, 6H, 2xCH$_3$), 2.97 (bs, 6H, 3xCH$_2$), 7.6-8.5 (bm, 6H, CHarom.), 9.98 (bs, 2H, 2xCHO.). The actual concentrations (%) were 72.16 C, 4.86H, and 15.34 S. C$_{25}$H$_{20}$O$_2$S$_2$. The calculated concentrations (%) were 72.08 C, 4.84H, and 15.40 S.

3.57 g of 84% 1,2-Bis-(2,5-dimethyl-6-formyl-1-benzothiophen-3-yl)cyclopentene 5b and a melting range of about 181° C. to about 183° C. (hexane:chloroform, 6:1, vol.). The mass-spectrum was m/z: 444, [M]+m the NMR spectrum 1H (DMSO-d$_6$, δ, ppm, J/Hz) was 2.0-2.4 (m, 2H, CH$_2$), 2.55 (s, 6H, 2xCH$_3$), 2.86 (s, 6H, 2xCH$_3$), 2.95-3.25 (m, 4H 2xCH$_2$), 7.40 (bs, 2H, 2xCHarom.), 8.24 (bs, 2H, 2xCHarom.), 10.09 (bs, 2H, 2xCHO.). The actual concentrations (%) were 73.03 C, 5.43H, and 14.37 S. C$_{27}$H$_{24}$O$_2$S$_2$. The calculated concentrations (%) were 72.94 C, 5.44H, and 14.42 S.

0.96 g of 65% of 1,2-Bis-(2,7-dimethyl-6-formyl-1-benzothiophen-3-yl)cyclopentene 5c had a melting range of about 163° C. to about 165° C. (hexane:chloroform, 6:1, vol.). The mass-spectrum was m/z: 444, [M]+, the NMR spectrum 1H (DMSO-d$_6$, δ, ppm, J/Hz) was 2.05-2.35 (m, 2H, CH$_2$), 2.50 (s, 6H, 2xCH$_3$), 2.91 (s, 6H, 2xCH$_3$), 3.0-3.25 (m, 4H, 2xCH$_2$), 7.32 (bd, 2H, 2xCHarom.), 7.79 (bd, 2H, 2xCHarom.), 10.10 (bs, 2H, 2xCHO.). 72.90 C, 5.43 H, and 14.48 S. C$_{27}$H$_{24}$O$_2$S$_2$. The calculated concentrations (%) 72.94 C, 5.44H, and 14.42 S.

1.05 g of 68% of 1,2-Bis-(2,4-dimethyl-5-formyl-1-benzothiophen-3-yl)cyclopentene 5d had a melting range of about 187° C. to about 189° C. (hexane:chloroform, 6:1, vol.). The mass-spectrum was m/z: 444, [M]+, the NMR spectrum 1H (DMSO-d$_6$, δ, ppm, J/Hz) was 2.0-2.35 (m, 2H, CH$_2$) was 2.54 (s, 6H, 2xCH$_3$), 2.97 (s, 6H, 2xCH$_3$), 3.1-3.3 (m, 4H, 2xCH$_2$), 7.47 (bd, 2H, 2xCHarom.), 7.90 (bd, 2H, 2xCHarom.), 10.31 (bs, 2H, 2xCHO.). The actual concentrations (%) were 72.99 C, 5.45H, and 14.38 S. C$_{27}$H$_{24}$O$_2$S$_2$. The calculated concentrations (%) were 72.94 C, 5.46H, and 14.42 S.

0.77 g of 52% of 1,2-Bis-(2,6-dimethyl-5-formyl-1-benzothiophen-3-yl) cyclopentene 5e had a melting range of about 201° C. to about 203° C. (hexane:chloroform, 6:1, vol.). The mass-spectrum was m/z: 444, [M]+, the NMR spectrum 1H (DMSO-d$_6$, δ, ppm, J/Hz) was 2.0-2.4 (m, 2H, CH$_2$), 2.52 (s, 6H, 2xCH$_3$), 2.85 (s, 6H, 2xCH$_3$), 3.0-3.35 (m, 4H, 2xCH$_2$), 7.31 (bs, 2H, 2xCHarom.), 8.42 (bs, 2H, 2xCHarom.), 10.28 (bs, 2H, 2xCHO.). The actual concentrations (%) were 73.01 C, 5.46H, and 14.35 S. C$_{27}$H$_{24}$O$_2$S$_2$. The calculated concentrations (%) were 72.94 C, 5.44H, and 14.42 S.

EXAMPLE 2

The synthesis of polyazomethine (Compound III) was carried out according to Equation 3 using 1,2-bis(2-methyl-6-formyl-1-benzothiophen-3-yl) cyclopentene (Compound I) and benzidine. 0.25 g (0.6 mmole) of 1,2-bis(2-methyl-6-formyl-1-benzothiophen-3-yl)cyclopentene (Compound I), 0.110 g (0.6 mmole) of benzidine (Compound II), 1 mL each of N-methylpyrrolidone, hexamethyl phosphoramide and 0.047 g of dry LiCl were placed in a three-necked flask with a capacity of 25 mL, provided with a stirrer, reflux condenser and inlet for argon. The solution was stirred for 16 hours at room temperature and then the reaction mixture was poured into methanol. The resulting residue was washed with water, washed with methanol, and the polymer was dried under vacuum for 24 hours at 60° C.

Equation 3

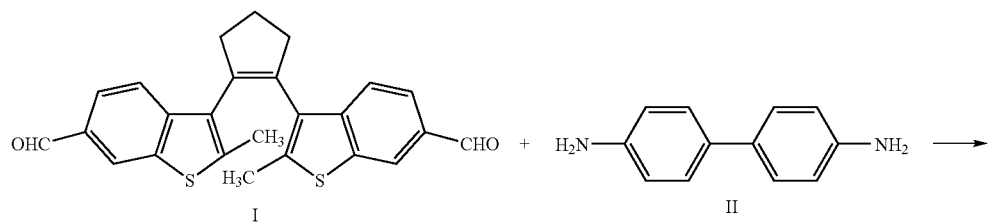

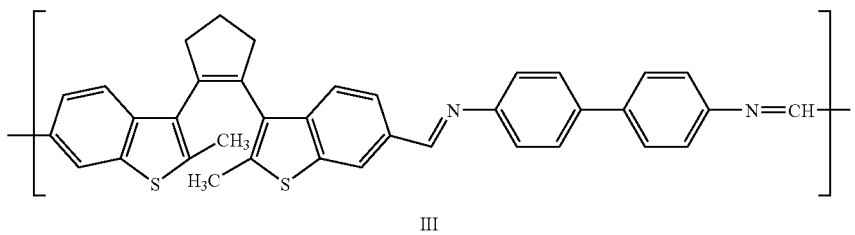

The yield of the polymer (Compound III) was about 97%. IRS (KBr, cm−1): C=N 1680. Mn=35000. The polymer is soluble in chloroform, THF, when heated in dimethylformamide (DMFA) and toluene, and is insoluble in ethanol and acetone.

Figure 3:
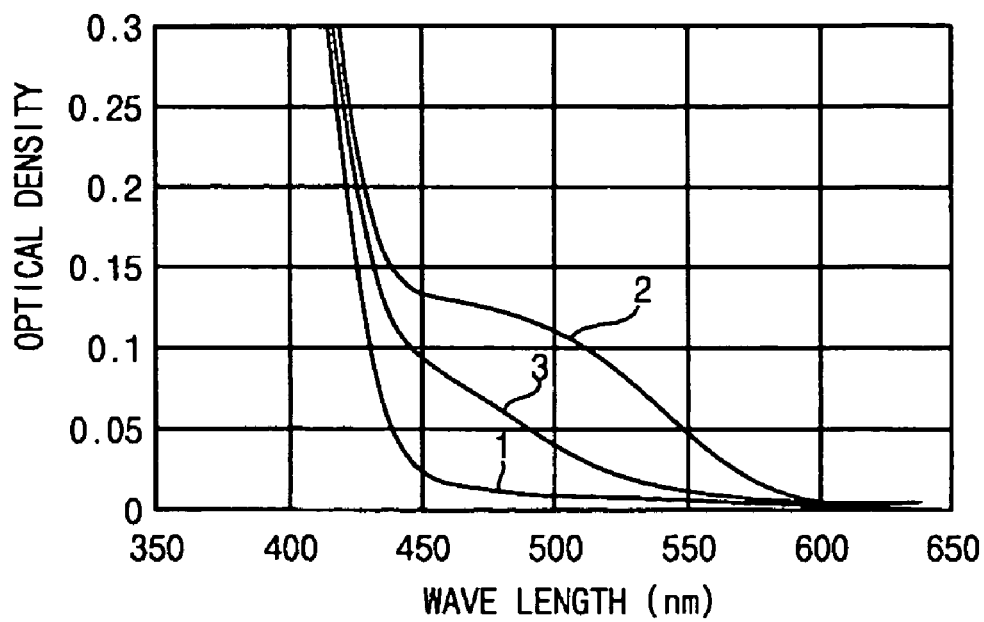
FIG. 3 shows absorption spectra of the initial open A form (curve 1) and photoinduced B (curve 2) form after UV irradiation through a glass light filter YФC-2 and also after irradiation by visual light through a glass light filter жC-12 (curve 3) for a film of photochromic polymer III in polycarbonate (4 wt % of the weight of dry polymer).
Figure 4:
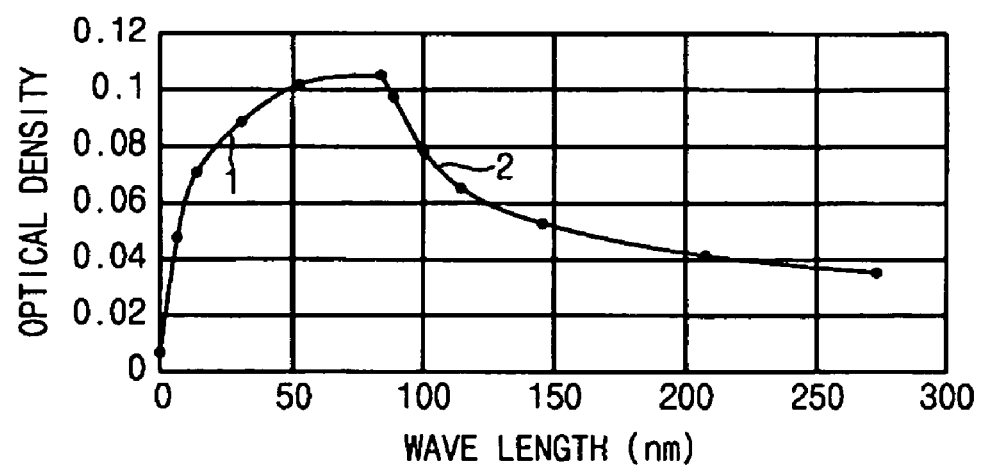
FIG. 4 shows kinetic photocoloring curves with UV light through a glass light filter YФC-2 (curve 1) and photodecoloring with visual light through a glass light filter жC-12 (curve 2) for film of photochromic polymer III in polycarbonate (4 wt % of the weight of dry polymer) at a wavelength of the maximum of the band of absorption of cyclic form B.

A sample of a photochromic polymer for measurement of spectral-kinetic characteristics was prepared by the joint dissolution of the photochromic polymer and polycarbonate, which was used as the polymer binder, in chloroform. Then the solution was applied onto a quartz substrate using a centrifuge. As a result, a photochromic film was obtained and the absorption spectra of form A (FIG. 3, curve 1) and form B (FIG. 3, curve 2), and also kinetic photocoloring curves (FIG. 4, curve 1) and photodecoloring curves (FIG. 4, curve 2) were measured according to the method of Example 1. A reduction of the photoinduced optical density under the action of visual light demonstrates the reversibility of photochromic conversions (FIG. 3, curve 3). The obtained spectral-kinetic data provide evidence of the photochromism of the obtained sample of photochromic film.

EXAMPLE 3

Polyazomethine IIIa of Structural Formula 6 was obtained from the photochromic monomer of Structural Formula 1 and 3,3'-diaminodiphenyl in a manner similar to Example 2. The yield was 92%. Mn=28000. The polymer is soluble in chloroform, tetrahydrofuran, dimethylformamide, and toluene, and is not soluble in ethanol and acetone.

Structural Formula 6

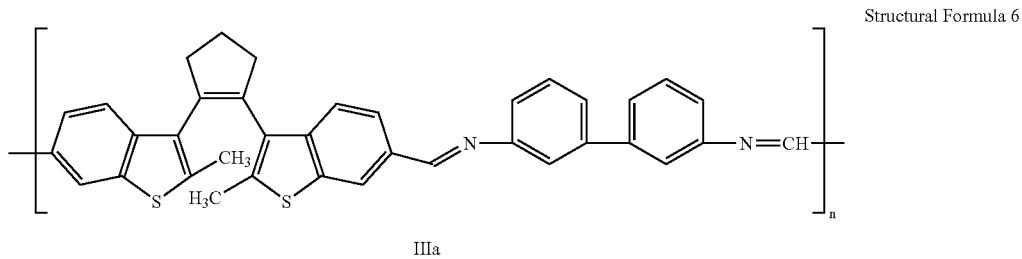

IIIa

The spectral-kinetic characteristics, measured by the method described in Example 1 on a sample of a photochromic polymer prepared according to the method presented in Example 2, show a virtually acceptable photochromism of this polymer.

EXAMPLE 4

Polyazomethine IIIb of Structural Formula 7 was obtained from the photochromic monomer of Structural Formula 1 and 4,4'-diaminoazobenzene in a manner similar to Example 2. The yield was 95%. Mn=26000. The polymer is soluble in chloroform, tetrahydrofuran, and dimethylformamide, and is not soluble in toluene, ethanol, and acetone.

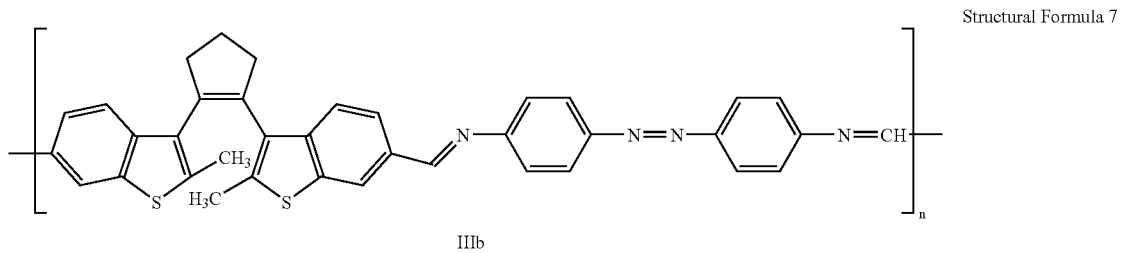

Structural Formula 7

IIIb

The spectral-kinetic characteristics, measured by the method described in Example 1 on a sample of a photochromic polymer prepared according to the method presented in Example 2, show a virtually acceptable photochromism of this polymer.

EXAMPLE 5

Polyazomethine IIIc of Structural Formula 8 was obtained from the photochromic monomer of Structural Formula 1 and 4,4'-diaminodiphenyl azomethylene in a manner similar to Example 2. The yield was 90%. Mn=31000. The polymer is soluble in chloroform, tetrahydrofuran, and dimethylformamide, and is not soluble in toluene, ethanol, and acetone.

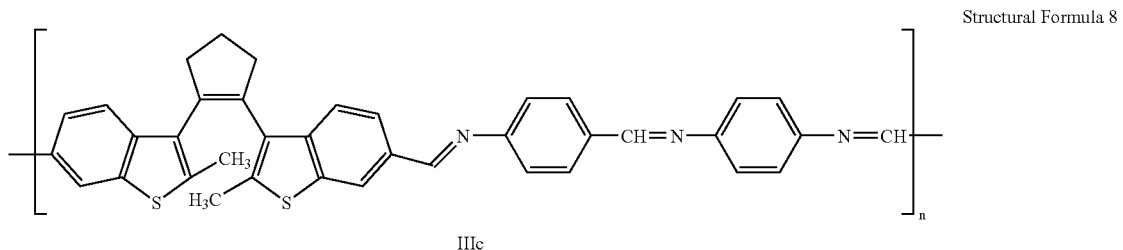

Structural Formula 8

IIIc

The spectral-kinetic characteristics, measured by the method described in Example 1 on a sample of a photochromic polymer prepared according to the method presented in Example 2, show a virtually acceptable photochromism of this polymer.

EXAMPLE 6

Polyazomethine IIId of Structural Formula 9 was obtained from the photochromic monomer of Structural Formula 1 and 2—(p-aminophenyl)-5(6)-aminobenzimidazole, in a manner similar to Example 2. The yield was 98%. Mn=38000. The polymer is soluble in dimethylformamide and is not soluble in chloroform, tetrahydrofuran, toluene, ethanol, and acetone.

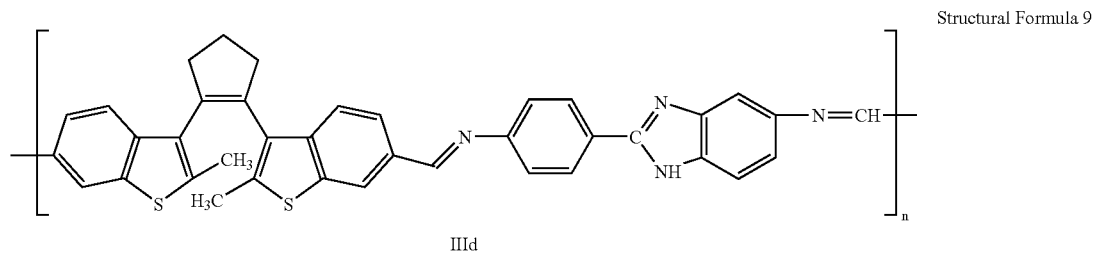

IIId

Structural Formula 9

The spectral-kinetic characteristics, measured by the method described in Example 1 on a sample of a photochromic polymer prepared according to the method presented in Example 2, show a virtually acceptable photochromism of this polymer.

EXAMPLE 7

Synthesis of the frame polyazomethine V from photochromic monomer I and anilinphthalein IV was performed according to Equation 4. As shown in Equation 4, polymer V based on compound I and anilinphthalein IV was obtained in a manner similar to polyazomethine III as in Example 2. The yield was 96%. IK (KBr, cm−1): C=N 1680. Mn=30000. The polymer is soluble in chloroform, tetrahydrofuran, dimethylformamide, and upon heating in toluene, and is not soluble in ethanol and acetone.

Equation 4

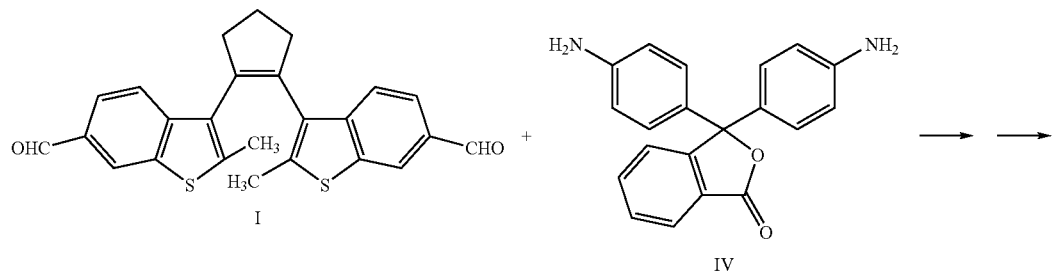

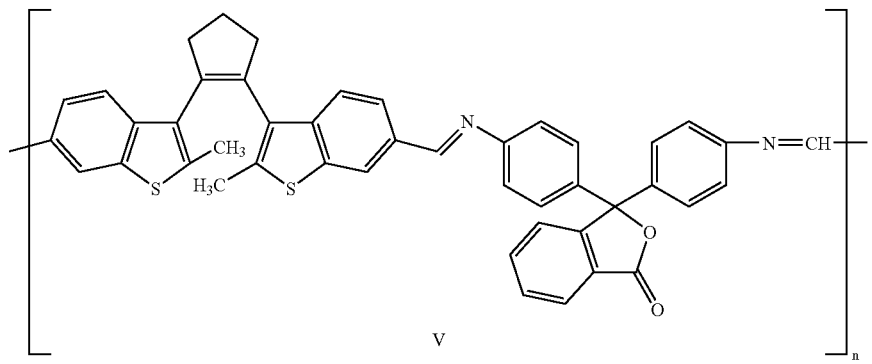

V

Figure 5:
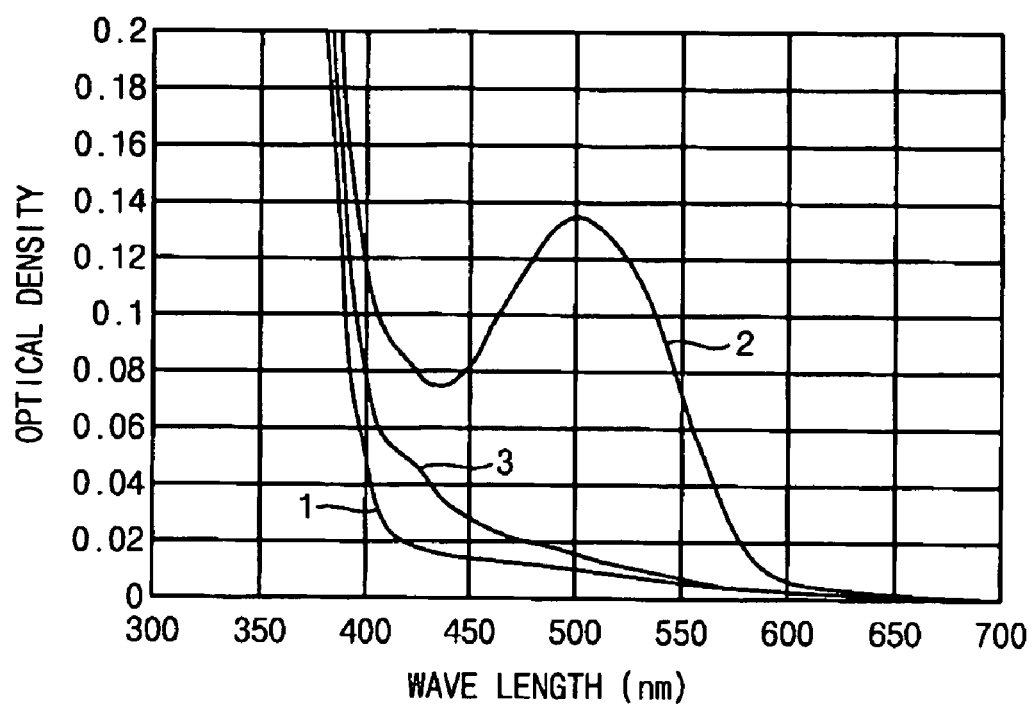
FIG. 5 shows the absorption spectra of the initial open A form (curve 1) and photoinduced B form after irradiation with UV light through a glass light filter YФC-2 (curve 2), and also after irradiation with visual light through a glass light filter жC-12 (curve 3) for a film of photochromic polymer V in a polycarbonate (4 wt % of the weight of a dry polymer).
Figure 6:
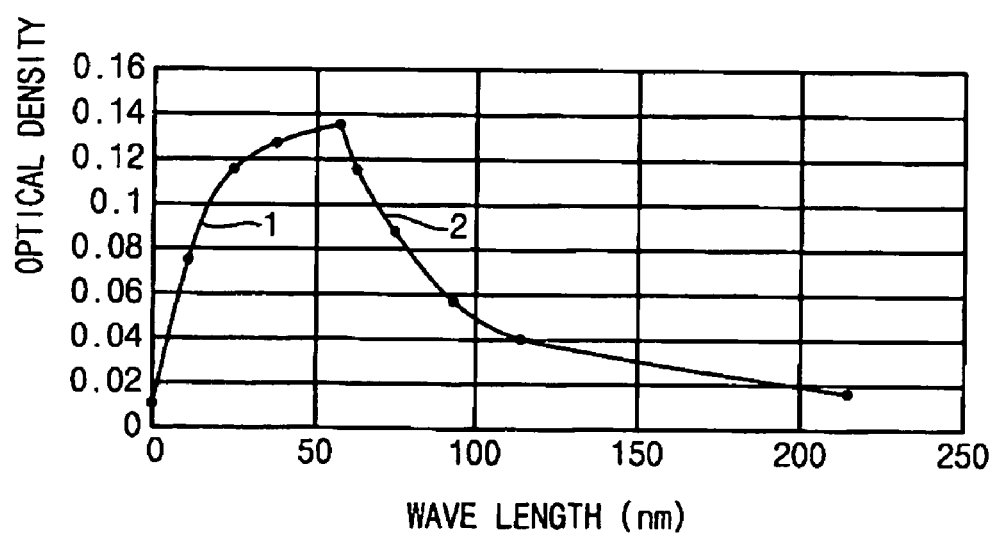
FIG. 6 shows kinetic photocoloring curves with UV light through a glass light filter УФС-2 (curve 1) and photodecoloring with visual light through a glass light filter жС-12 (curve 2) for a film of photochromic polymer V in polycarbonate (4 wt % of the weight of a dry polymer) at a wavelength of the maximum of the band of absorption of cyclic form B.

A sample of a photochromic polymer for spectral-kinetic studies was prepared by the method described in Example 2. The spectral-kinetic measurements were carried out according to the method described in Example 2. The obtained absorption spectra of the initial and photoinduced forms (FIG. 5) and the kinetic photocoloring curves and photodecoloring (FIG. 6) show acceptable photochromism of the prepared sample of photochromic film.

EXAMPLE 8

The frame polymer Va of Structural Formula 10 was obtained from the photochromic monomer of Structural Formula 1 and anilinfluorene was obtained in a manner similar to polyazomethine V. The yield was 92%. Mn=32000. The polymer is soluble in chloroform, tetrahydrofuran, and dimethylformamide, and is not soluble in toluene, ethanol, and acetone.

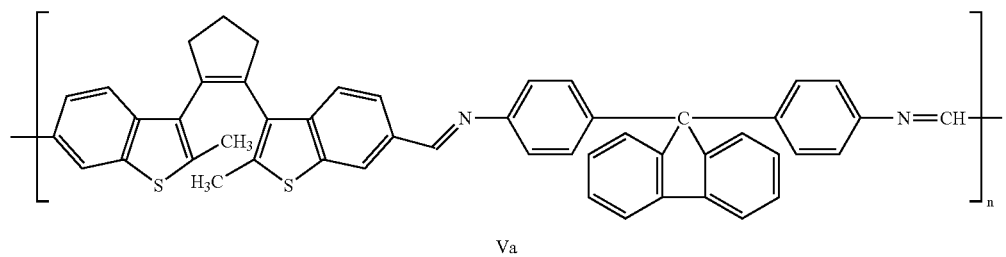

Va

Structural Formula 10

The spectral-kinetic characteristics, measured by the method described in Example 1 on a sample of a photochromic polymer prepared according to the method presented in Example 2, show a virtually acceptable photochromism of this polymer.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for preparing a photochromic monomer with a general formula,

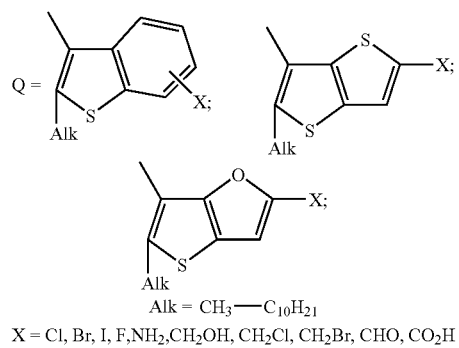

Alk = $CH_3$—$C_{10}H_{21}$
X = Cl, Br, I, F, $NH_2$, $CH_2OH$, $CH_2Cl$, $CH_2Br$, CHO, $CO_2H$ the method comprising:

acylation of benzothiophene with a dichloranhydride of glutaric acid in methylene chloride in the presence of aluminum chloride;

reductive cyclization of the obtained diketones under the action of $TiCl_4$, Zn in THF in the presence of pyridine; and

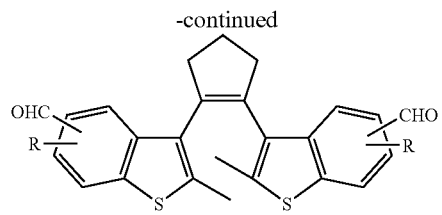

formylation of the reaction products with dichloromethyl ether in nitrobenzene in the presence of aluminum chloride, wherein R represents a hydrogen atom or a methyl group.

2. A photochromic polyazomethine, comprising:
a photochromic monomer with a general formula,

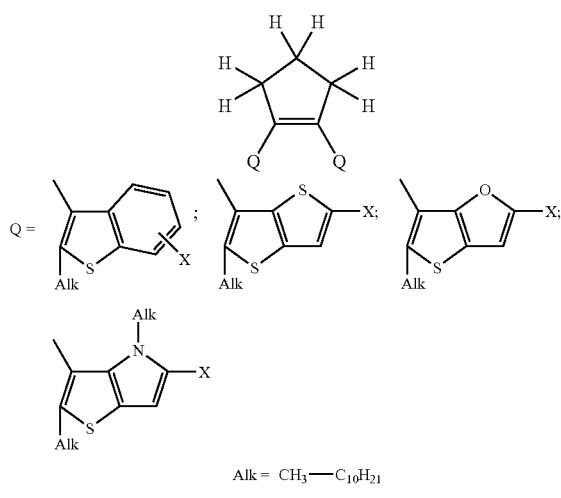

Alk = $CH_3$—$C_{10}H_{21}$
X = Cl, Br, I, F, $NH_2$, $CH_2OH$, $CH_2Cl$, $CH_2Br$, CHO, $CO_2H$ wherein the photochromic polyazomethine has a molecular weight ranging from about 25,000 to about 50,000; and wherein the photochromic polyazomethine has a general structural formula:

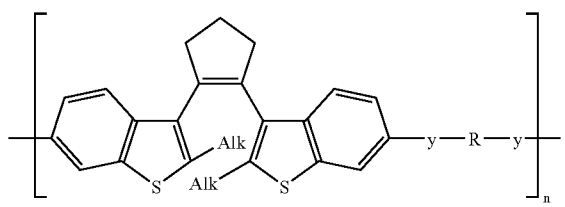

wherein Alk is CH$_3$—C$_{10}$H$_{21}$, y=C==N or —N==C—, n=about 50 to about 100, and R = 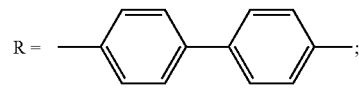;

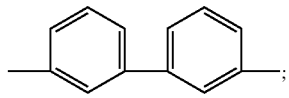;

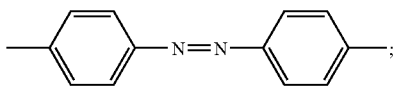;

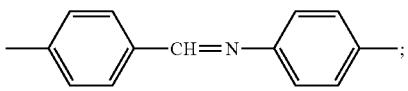;

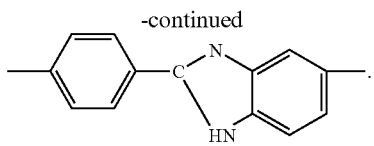.

3. A method for preparing the photochromic polyazomethine of claim 2, comprising:
polycondensation a solution of a photochromic monomer of claim 1 with aromatic diamines or dialdehydes at a temperature of from about 20° C. to about 200° C.

4. A photochromic frame polyazomethine, comprising:
a photochromic monomer with a general formula,

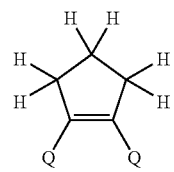

Q = 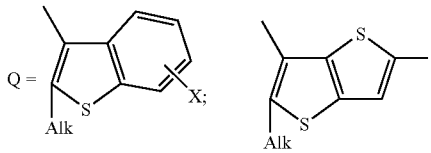

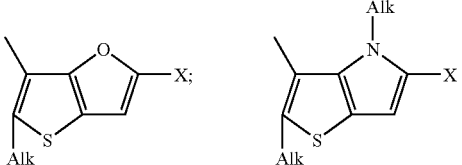

Alk = CH$_3$—C$_{10}$H$_{21}$
X = Cl, Br, I, F, NH$_2$, CH$_2$OH, CH$_2$Cl, CH$_2$Br, CHO, CO$_2$H wherein the photochromic frame polyazomethine has a molecular weight of about 30,000 to about 50,000, and wherein the photochromic frame polyazomethine has a general structural formula:

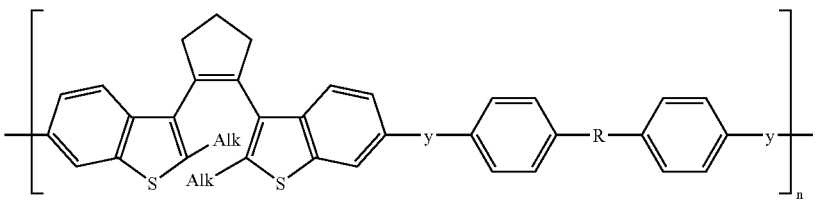

wherein Alk is $CH_3$—$C_{10}H_{21}$, y is —C≡≡N— or —N≡≡C—, n is about 50 to about 100, and

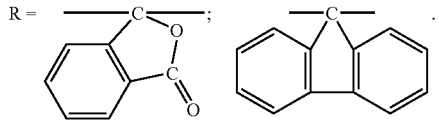

5. A method for preparing the frame photochromic polyazomethine of claim 4, comprising:
polycondensation a solution of the photochromic monomer of claim 1 with frame aromatic diamines or dialdehydes at a temperature of from about 20° C. to about 200° C.

6. A photonic device, comprising: the photochromic polyazomethine of claim 2.

7. A photonic device, comprising: the photochromic frame polyazomethine of claim 4.

* * * * *